United States Patent

Heyer et al.

Patent Number: 5,962,569

Date of Patent: Oct. 5, 1999

[54] EPIHALOHYDRIN ELECTRICAL STRESS CONTROLLING MATERIAL

[75] Inventors: Thomas J. D. Heyer, Austin; Robert A. Wandmacher, Cedar Park, both of Tex.

[73] Assignee: 3M Innovative Properties Company, St. Paul, Minn.

[21] Appl. No.: 09/103,069

[22] Filed: Jun. 23, 1998

Related U.S. Application Data

[60] Division of application No. 08/694,344, Aug. 8, 1996, Pat. No. 5,804,630, which is a continuation-in-part of application No. 08/534,390, Sep. 6, 1995, abandoned.

[51] Int. Cl.$^6$ ....................................................... C08J 3/20
[52] U.S. Cl. ........................ 524/441; 524/444; 525/474; 525/403; 525/476; 174/137 B
[58] Field of Search ...................................... 525/474, 403, 525/476; 174/137 B; 524/441, 444

[56] References Cited

U.S. PATENT DOCUMENTS

| | | | |
|---|---|---|---|
| 5,010,137 | 4/1991 | Umeda et al. | 525/104 |
| 5,804,630 | 9/1998 | Heyer et al. | 524/436 |

*Primary Examiner*—Margaret W. Moore
*Attorney, Agent, or Firm*—Darla P. Fonseca

[57] ABSTRACT

A non-tacky electrical stress control material comprising
  a) about 100 parts of a resin component containing
    1) from about 20% to about 80% of an epihalohydrin polymer, and
    2) correspondingly, from about 80% to about 20% of an insulating silicone polymer having a tan δ of less than one,
  b) from about 10 to about 200 parts of a filler, said filler being nonconductive at room temperature, selected from the group consisting of barium titanate and hydrated aluminum silicate, and
  c) from 0 to 30 parts of a plasticizer.

5 Claims, No Drawings

EPIHALOHYDRIN ELECTRICAL STRESS CONTROLLING MATERIAL

This is a division of application Ser. No. 08/694,344 filed Aug. 8, 1996, now U.S. Pat. No. 5,804,630 which was a CIP of Ser. No. 08/534,390, Sep. 6, 1995 now abandoned.

BACKGROUND OF THE INVENTION

1. Field of the Invention

The present invention relates to non-tacky conformable material suitable for use as a void filling, electrical stress controlling material. Specifically, it relates to nontacky core-loadable epihalohydrin polymer compositions which exhibit effective stress control when used at the edge of a semi-conductive shield in a termination either alone or in conjunction with a high dielectric constant tube.

1. Description of the Art

Heat-recoverable rubbery tubular articles and elastically recoverable tubular articles are widely used to cover power cables or conduits. Such articles are useful where insulation, sealing and/or encapsulation are required. A typical elastically recoverable article is a rubber insulating sleeve which is provided with an inner support or "core" which holds the article in a deformed shape. The tube is placed over a cable, and the core is unwound, and removed. The article then recovers toward an original shape.

Various compositions have been used in coordination with such articles to provide electrical stress control and sometimes to bond them to various types of pipe and tubing, e.g., mastics, tapes, and greases as in U.S. Pat. Nos. 4,017,652, and 4,383,131.

U.S. Pat. No. 4,363,842 discloses elastomeric prestretched tubes formed from EP or EPDM with a variety of fillers including carbon black, conductive particles and the like, including carbon black, and aluminum flakes. Barium titanate is disclosed for providing stability of permittivity over a wide range of electrical stresses; barium titanate does not provide higher permittivity to the elastomeric tubes.

Heat-recoverable articles may also be provided on an inner tube, which breaks and allows the elastomeric member to recover. These articles are heated with a hot air gun or torch, to initiate recovery.

Both types of articles may recover around the cable joint or termination (or other substrate) tightly in areas, and have air pockets between the cable and the substrate about which it is recovered in other areas, such as a semiconducting layer edge, which is highly undesirable. Sealing compositions, such as greases, adhesives, and the like have been used with these articles to reduce or eliminate such air pockets. Many of such compositions have been adhesives which have bonded between the recoverable articles and the substrate about which it is recovered.

EP Patent 0424 090 B 1 discloses an elastomeric covering for connections in electrical cables having a conformable material interposed between the prestretched tube and the core, whereby when the core is removed, the elastic forces change the shape and dimensions of the material to correspond to the underlying surface. No electrical properties are disclosed, and a broad range of materials are simply listed.

U.S. Pat. No. 4,378,463 discloses an adhesive for use in heat recoverable products in areas of electrical stress. The adhesive comprises an epihalohydrin polymer, a tackifier, a catalyst, and a particulate filler. The composition bonds the heat-recoverable article to the substrate, and also provides electrical stress relief. No polymer blends are disclosed.

However, the above composition has some disadvantages. First, it must be provided separately, and cannot be preloaded into the splice or termination as the composition will adhere thereto or to the core and either prevent its removal when it is time to initiate recovery or deform and fracture during removal, causing the formation of large air pockets.

Applicant has now discovered that a non-tacky stress control material containing an epihalohydrin polymer, and an insulative polymer having a tan δ of less than 1, and having certain fillers provides unique electrical properties for use in stress control, i.e., excellent permittivity. Such compositions exhibit synergism between the combination of polymers and the fillers not seen when only one type of polymer is used with the same fillers. The materials have significantly improved results on electrical properties such as permittivity, alternating current voltage withstand tests, impulse withstand, and/or tan δ values.

Further, compositions of the invention may be aged in cable oil and neither swell nor lose their electrical properties.

The compositions may be used alone inside the insulator of an electrical cable, and are suitable for preloading in an elastically shrinkable tube such as a splice cover or termination supported on a removable rigid core, or underneath a pre-stretched elastomeric or heat shrhinkable stress control tube.

SUMMARY OF THE INVENTION

The present invention provides a non-tacky electrical stress control material comprising
   a) about 100 parts of a resin component containing
      1) from about 20% to about 80% of an epihalohydrin polymer, and
      2) correspondingly, from about 80% to about 20% of a silicone polymer having a tan δ of less than one,
   b) from about 10 to about 200 parts of a filler, said filler being nonconductive at room temperature, selected from the group consisting of barium titanate and hydrated aluminum silicate, and
   c) from 0 to 30 parts of a plasticizer.

Preferred non-tacky electrical stress control materials comprise
   a) about 100 parts of a resin component containing
      1) from about 20% to about 80% of an epihalohydrin polymer, and
      2) correspondingly, from about 80% to about 20% of a silicone polymer having a tan δ of less than one,
   b) from about 80 to about 120 parts barium titanate, and
   c) from 0 to 30 parts of a plasticizer.

The following terms have the defined meanings when used herein.

1. The term "elastically shrinkable" means that an article so described is in a stretched or radially expanded condition and will shrink to another condition when permitted to do so, with no heat required.
2. The term "cold-shrinkable" is synonymous with the term "elastically shrinkable".
3. The term "core" refers to the supporting article upon which the elastically shrinkable article is deformed in a radially expanded or stretched condition.
4. The terms "insulator" and "insulative polymer" means a polymer with a volume resistivity greater than about $10^{10}$ ohm-cm.
5. The term "epihalohydrin polymer" includes homopolymers, copolymers, terpolymers, etc.
6. The term "tan delta" or "tan δ" refers to the electrical dissipation factor.
7. The term "permittivity" or "relative permittivity" is the ratio of electric flux generated by an electrical field in a medium to that generated by the field in a vacuum.

8. The term "dielectric constant" is synonymous to relative permittivity.

All ratios, parts, and percents described herein are by weight, unless otherwise specifically stated.

DETAILED DESCRIPTION OF THE INVENTION

The materials of the invention comprise a resin component which consists of a blend of two polymeric resins; epihalohydrin polymers and insulating silicone polymers having a tan δ of less than 1.

Epihalohydrin polymers suitable for use in the compositions of the invention are the elastomeric polymers of an epihalohydrin in homopolymer or copolymer form. Such polymers are prepared by polymerization of the monomeric material in mass or in solution with organometallic catalysts, and may be homopolymers, copolymers, terpolymers, etc. Examples of homopolymers include epichlorohydrin, or epibromohydrin; useful copolymers include copolymers of epihalohydrins with alkylene oxides, and copolymers with epoxides, e.g., propylene oxide, ethylene oxide, butene oxide, and epoxy ethers such as ethylglycidyl ether, allylglycidyl ether and the like. Such polymers are available from Zeon Chemicals, Inc.

Preferred epihalohydrin polymers include copolymers with alkylene oxides, particularly ethylene and propylene oxides.

The resin component also contains an insulating silicone polymer having a tan δ of less than one. Useful silicones include silicones which are fluid at room temperature and gum silicones; gum silicones preferred for easy compounding and processability; most preferred are those gum silicones having a durometer of from about 5 to about 30. Surprisingly, silicone polymers having a durometer of 5 or more can be mixed with the epihalohydrin, and provide a product which exhibits faster flow, lower viscosity and a lower plasticity. The preferred silicones also exhibit a plasticity of less than 250, preferably less than 230.

Commercially available silicone elastomers include those fluid silicones available as Dow Corning DC 10,000, and the like, and gum silicones available as Elastosil® R300/40, and Wacker 7805 and 7815 from Wacker Silicones Corporation; Silastic® GP31 from Dow Corning, and the like.

The silicone polymer and the epihalohydrin are present in the resin component at a ratio of from about 20:80 to about 80:20, preferably from about 30:70 to about 70:30. Formulations comprising less than 20% insulative polymer may be useful in some applications but exhibit high tan δ values, which is undesirable for high voltage applications.

The composition contains from about 10 to about 200 parts per hundred resin (pph) of at least one particulate filler selected from fillers which are nonconductive at room temperature. Preferred fillers are aluminum silicate and barium titanate. Preferred materials comprise from about 25 to about 100 parts aluminum silicate or from about 50 to about 200 parts barium titanate. The most preferred filler is barium titanate. These resin blends show synergistic behavior with these fillers. Barium titanate is available from Ferro Corp. as Transelco 219-3, and hydrated aluminum silicate is available from J.M. Huber as Suprex®.

Materials of the invention exhibit significant improvements in electrical properties. Barium titanate containing materials exhibit improvement in permittivity and alternating load current withstand voltage, i.e., preferred materials exhibit both permittivities of above 15 and tan δ of less than 4, preferably around 1. Further, terminations employing materials of the invention show improvements in AC withstand; withstanding about 100 kV, terminations employing preferred materials withstand about 110 kV, as opposed to 95 kV or less for current conventional electrical stress control materials on 25 kV cable.

Further, there are two failure modes possible in such testing and impulse withstand testing; external flashover, and internal degradation of the material caused by heat. External flashover is preferred as the termination or joint is not destroyed and remains functional after the arc exinguishes. Terminations or joints using materials of the invention have a failure mode of flashover as opposed to those using conventional sealants which have a degradation failure mode.

Finally, materials of the invention show stability and integrity even when aged in oil for extended periods of time at high temperatures. Terminations or joints formed from the materials of the invention will exhibit identical electrical properties, or even improved properties and structural integrity even after being immersed in polybutene oil (the type used in paper insulated lead cables) for 90 days at 90° C. Conventional materials, such as those containing EP or EPDM type rubbers will swell after such aging and lose the electrical properties, such as dielectric constant.

Hydrated aluminum silicate containing materials exhibit superior tan δ values while retaining useful permittivities.

Materials of the invention may also comprise a plasticizer. Useful plasticizers include aliphatic, naphthenic, and aromatic petroleum based hydrocarbon oils; cyclic olefins (such as polycyclopentadiene); polyalphaolefins (such as hydrogenated polymerized decene-1), hydrogenated terphenyls or other terpene derivatives; polypropylene oxide mono- and di-esters, cyclopentadiene copolymers with fatty acid esters; phosphate esters and mono-, di-, and poly-esters, (such as trimellitates, phthalates, benzoates, fatty acid ester derivatives, fatty acid ester alcohols, dimer acid esters, glutarates, adipates, sebacates, polymeric polyesters, rosin esters, acrylate esters, epoxidized fatty acid esters, and the like) and mixtures thereof Preferred plasticizers include phosphate esters and polyesters and polyethers such as adipates, phthalates, azelates, and the like, i.e., dioctylphthalate, and dioctylazelate. The latter is available from C.P. Hall, as Plasthall® DOZ. The plasticizer may be present in an amount up to about 30 parts per hundred parts of resin.

The stress control materials may also include up to about 15 parts (pph resin) of metal flake or other conductive filler such as aluminum flake, or copper flake. Aluminum flake, such as that available from Silberline Mfg. Company as Silvex® 620-25-A, is preferred.

Materials of the invention may also contain minor amounts of other adjuvants such as antioxidants, dyes, pigments, flame retardants, release aids and the like so long as the addition does not negatively affect the electrical properties. Useful antioxidants include Agerite® MA, available from R. H. Vanderbilt Co. Useful process aids include fatty acids such as ATMER™ 103, available from ICI Americas, and Kemamide® U, available from Humko Chemicals.

Materials of the invention are especially useful in medium or high voltage power cables. The composition of the invention may be used alone, e.g., placed under an insulator of such cable in the region of the semiconductive cutback to fill voids. However, many cable joints or terminations use a pre-stretched stress control tube as well. Typically, pre-stretched tubes are provided on a rigid easily removable core. The core can be external or internal; however internal cores are preferable. Typical cores are such as those described in U.S. Pat. No. 3,515,798, incorporated herein by reference. Preferred terminations comprise a coordinated two-component or three-component stress-control system where the inner component is the conformable material of the invention, and the outer component is the high permittivity tubing. Alternatively, two layer structures include the material of the invention and an outer layer which is an insulator having high permittivity. A possible third layer is a polymeric insulator, typically a pre-stretched tube such as those described in U.S. Pat. No. 4,363,842, incorporated herein by reference.

When materials of the invention are used in such terminations, the electrical stress control is greatly improved, which allows a significant reduction in the required length of the termination. i.e., at least about 20% reduction, which reduces costs and installation space requirements. Preferred materials may allow a length reduction of 40% or more. The application of silicone grease is no longer required, nor is the application of tape or other sealing materials at the ends of the termination, as it may be sealed with the stress control material, which is core loadable, permitting its automatic delivery. Materials of the invention are typically loaded at thickness of from about 1.25 mm to about 3 mm, preferably from about 2 to about 3 mm.

Compositions of the invention are prepared by mixing the ingredients and then pressed, extruded, injection molded or calendared into the final form desired. The final product can be provided as sheets, shaped articles, or in putty form, as desired for the application.

The following examples are for illustrative purposes only, and are not meant to be limiting. One skilled in the art will easily think of variations within the scope of the invention, which is solely that defined by the claims.

TEST METHODS

Alternating Current Withstand and Basic Impulse Withstand Voltage Tests

The International Society of Electrical and Electronic Engineers (IEEE) sets the United States standard for high voltage cable; the test is conducted per IEEE48. In order to determine the limit of AC withstand, AC withstand voltage is increased in steps of 5 kV per hour until flashover or internal degradation breakdown occurs. In order to determine the limit of impulse withstand, impulse voltage is raised in steps until flashover or internal degradation breakdown occurs.

Electrical Properties

Electrical properties (permittivity, tan δ) were tested according to ASTM-D 150 using an impedance measurement method. The electrical properties were tested at an electrical stress of about 3 kV/cm to about 20 kV/cm.

Probe Tack Test

The probe test was performed according to ASTM D-2979.

Rubber Property-Plasticity and Recovery (Parallel Plate Method)

This test was performed according to ASTM D926-93, procedure A.

Adhesion to Core

For this test, a stress control material was placed onto a rigid core for an elastically shrinkable splice or termination by means of finger pressure. The core was then unwound, and the material was observed for deformation, fracture and adhesion to the core.

For samples which survived such test without deformation or fracture, another identical sample was placed on the core and an elastically shrinkable splice cover was placed onto the core. The sample was stored for 3 months, and then the core was unwound, and the material checked for deformation, fracture and adhesion to the core.

EXAMPLES

Example 1

Preparation of the Material 86.87 g of Hydrin® C45, 115.15 g of Dow-Corning Silastic® GP3 silicone elastomer, 20.20 gms of dioctyl azelate, available as Plasthall DOZ®, 72.73 gm of Transelco 219-3 barium titanate, 2 gm Kemamide® U, and 3 gm of Silcogum® black 095 black pigment were placed in the order listed, with the barium titanate being added in two steps in an internal Banbury® mixer at 60–80 rpm and each ingredient permitted to mix before adding the next. After all ingredients were added, the ingredients were mixed until the batch temperature reached at least 70° C. The batch was then dropped from the mixer and placed in sheet form onto a two roll mill, adding any material remaining in the pan.

Other materials were prepared on a two roll mill by setting the roll temperature to 60° C., adding the epichlorohydrin, and allowing it to band both rolls, and then mix for about two minutes. The silicone was then added, and mixed until the color was even. The barium titanate and plasticizer were added together, and mixed until dispersed. The pigment was added and mixed. The batch was then removed and allowed to cool.

Preparation of Test Samples

Samples of from about 1 mm to about 3 mm in thickness were prepared by pressing between parallel metal plates in a hydraulic or pneumatic press, using shims to set the final plate separation.

First, the material was made as described above, and then a sample was cut, placed between the plates and pressed for about 5 minutes. The sample was then inspected carefully to ensure no foreign matter or entrapped air was visible, as clean samples are required to insure proper dielectric testing.

Examples 2–4 and Comparative Examples C5–C8

These formulations of the invention were compounded as described in Example 1, except with differing ratios of resins and differing fillers. Suprex® clay is hydrated aluminum silicate, available from J.M. Huber Co. Example 4 contains no plasticizer.

During processing of various batches of material for Example C6, the batches became "nervy", i.e., it lost its smooth flowability and was lumpy, and difficult to further process into slabs or sheets. Clearly, processing time is critical, and good primary and secondary processing is very difficult to acheive with this material.

TABLE 1

| Ingredient/Example No. (pph*) | 1 | 2 | 3 | 4 | C5 | C6 | C7 | 8 |
|---|---|---|---|---|---|---|---|---|
| Hydrin ® | 50 | 50 | 50 | 50 | 84 | 50 | — | 30 |
| Silastic ® GP31 | 50 | 50 | 50 | 50 | 16 | 50 | 60 | — |
| Wacker R300/30 | — | — | — | — | — | — | — | 70 |
| Nordel 1440 | — | — | — | — | — | — | 40 | — |
| Hectorite Clay | — | — | — | — | 4 | 20 | — | — |
| Plasthall DOZ ® | 10 | 10 | 10 | — | 5 | — | — | — |
| Suprex ® Clay | — | — | 29 | — | — | — | — | — |

TABLE 1-continued

| Ingredient/Example No. (pph*) | 1 | 2 | 3 | 4 | C5 | C6 | C7 | 8 |
|---|---|---|---|---|---|---|---|---|
| BaTiO$_2$ | 60 | 60 | — | 60 | — | — | 60 | 100 |
| Aluminum Flake | 8 | — | — | 8.5 | — | — | 8.5 | — |
| Kemamide ® U | 2 | 2 | 2 | 2 | 2 | 2 | 2 | 3 |
| SilicoBlack 95 | 3 | 3 | 3 | 3 | 3 | 3 | 3 | 3 |

*parts per hundred resin

The formulations described in Table 1 were then made into samples and electrical properties were tested. Results of those tests are shown in Table 2.

Example 4 was also tested in a termination having a tubular design, with a 21.6 cm insulation shield cutback, an overall length of approximatly 33 cm. The electrical stress control material was placed into the termination at a thickness of 2 mm. The termination was tested on a 25 kV 1/0 AWG cable, Jacketed Concentric Neutral. The AC Withstand was 120 kV with the failure mode being flashover, and the Maximum Impulse Withstand was +195 kV, and +196 kV, for Positive and Negative polarities, respectively.

Example C7 is an embodiment of U.S. Pat. No. 4,363,842 (Nelson). As is shown in Table 2 below, a material using a silicone/EPDM construction rather than the silicone epihalohydrin blend resins of the invention. Such material does not have a good dielectric constant even when 8.5 parts of aluminum flake is added, only reaching 4.47.

It is desirable to have a combination of a dielectric constant above 9, preferably above 10, and a tan δ of less than 4. Note that for the comparative examples C5 and C7, this combination is not met, while each of the examples of the invention meets these criteria. C5 becomes resistive, e.g., at high stresses, which is extremely undesirable. Comparative example C6 shows reasonable electrical properties; however, as noted above, processing of this material is very difficult.

TABLE 2

| Elec Properties/Example No. | 1 | 2 | 3 | 4 | C5 | C6 | C7 |
|---|---|---|---|---|---|---|---|
| tan δ * | 2.9 | 2.8 | 0.77 | 2.9 | 58 | 3.3 | .022 |
| dielectric constant* | 49 | 36 | 11 | 49.2 | 28 | 17.7 | 4.47 |

*These numbers are the average dielectric constant and dissipation factor, tan δ, over electrical stresses from 3,000–20,000 v/cm.

Example 8

A sample was made according to the invention containing the following ingredients; 30 parts Hydrin® C-45, and 70 parts Wacker R300/30 silicone, 100 pph Transelco BaTiO$_2$, 3 pph Kemamide® U, and 3 pph Silicogum Black 0.095. The composition was tested for electrical properties as discussed above, and found to have an average dielectric constant of 35, and an average tan δ of 0.97. The sample had an average plasticity according to ASTM D926-93 of 235.

The sample was then aged in cable oil, i.e., polybutene oil for 90 days and 90° C. The dielectric constant rose an average of about 2% after such aging.

Example C9

An example of the mastic disclosed in U.S. Pat. No. 4,378,463 was prepared as described. This sample along with samples 1, 2 and 3 of the invention were subjected to the probe tack test. Example C9 had an adhesion to the core such that upon unwinding the core, the adhesive deformed and fractured along the separating helical core weld lines, and remained firmly adhered to the unwound core strand.

The Examples of the invention all allowed unwind without any visible deformation or fracture, and did not adhere to the core. Further samples of Examples 1–3 were then placed upon cores, and elastically shrinkable material of U.S. Pat. No. 4,363,842 was placed thereover. These were stored at ambient temperatures for 60 and 90 days, and then removed. The electrical stress control material even after such storage associated with the elastomerically shrinkable material and did not adhere to the core, nor were any deformations or fractures visible.

A room temperature probe tack was also run on Example C9, and Examples 1–3. The results were as shown in Table 3.

TABLE 3

| Ex. | Temp (° C.) | Dwell Time (s) | Probe Speed (cm/s) | Sample Holder | Max. Force (g) | Comments |
|---|---|---|---|---|---|---|
| C9 | 23 | 100 | 0.01 | aluminum | 101 | did not debond |
| C9* | 23 | 20 | 0.01 | aluminum | 283 | did not debond |
| 1 | 23 | 100 | 0.01 | aluminum | Not Applicable | no adhesion |

*Steel backing used to limit deformation of material.

A sample was made according to the invention containing the following ingredients: 30 parts Hydrin® C-45, and 70 parts Wacker 7805 silicone, 100 pph Transelco BaTiO$_2$, 3 pph Kemamide® U, and 3 pph Silicogum Black 0.095. The composition was tested for electrical properties as discussed above, and found to have an average dielectric constant of 28.34 and an average tan δ of 0.85. The sample had an average plasticity according to ASTM D926-93 of 208.

What is claimed is:

1. A non-tacky electrical stress control material comprising
    a) about 100 parts of a resin component consisting of a blend of
        1) from about 20% to about 80% of an epihalohydrin polymer, and
        2) correspondingly, from about 80% to about 20% of an insulating silicone polymer having a tan δ of less than one, such silicone being a gum silicone having a durometer of from about 5 to about 30,
    b) from about 10 to about 100 parts hydrated aluminum silicate, and
    c) from 0 to 30 parts of a plasticizer,
said material having a permittivity greater than about 15, and a tan δ of less than 4 when tested under electrical stress of from at least about 3 kV/cm to about 20 kV/cm.

2. A non-tacky electrical stress control material according to claim 1 wherein said material has a tan δ of less than 1 where said material is tested under electrical stress of from about 3 kV to about 20 kV/cm.

3. A non-tacky electrical stress control material according to claim 1 wherein said resin component consists of from about 30% to about 70% of an epihalohydrin polymer, and correspondingly, from about 70% to about 30% of a silicone polymer having a tan δ of less than one.

4. A non-tacky electrical stress control material according to claim 3 further comprising from about 1 part to about 15 parts per hundred parts of the resin component, of a metal flake.

5. A non-tacky electrical stress control material according to claim 4 wherein said metal flake is aluminum flake.

* * * * *

UNITED STATES PATENT AND TRADEMARK OFFICE
CERTIFICATE OF CORRECTION

PATENT NO. : 5,962,569  Page 1 of 1
DATED : October 5, 1999
INVENTOR(S) : Thomas J.D. Heyer and Robert A. Wandmacher It is certified that error appears in the above-identified patent and that said Letters Patent is hereby corrected as shown below:

Title page,
Item [60], application serial No. "08/534,390" should read -- 08/524,390 --.
Item [56], U.S. PATENT DOCUMENTS, insert the following references:

-- 3,515,798 ............6/1970 ............Sievert................ 174/135
   3,859,576 ............1/1975 ............Sheckler et al ..... 317/262
   4,017,652 ............4/1977 ............Gruber............... 427/54
   4,203,886 ............5/1980 ............Hirai et al.......... 260/37
   4,265,800 ............5/1981 ............Newton.............. 260/37
   4,363,842 ............12/1982 ...........Nelson............... 428/36
   4,378,463 ............3/1983 ............Senior et al........ 174/73
   4,383,131 ............5/1983 ............Clabburn............ 174/73
   4,412,029 ............10/1983 ...........Kehr et al.......... 524/441
   5,455,383 ............10/1995 ...........Tanaka............... 174/36 --

After last U.S. PATENT DOCUMENT, insert:
       -- FOREIGN PATENT DOCUMENTS
0279414A2 ............8/1988 ............European Patent
0435554A2 ............7/1991 ............European Patent
0424090B1 ............9/1994 ............European Patent
2371804 ..............11/1976 ...........France --

Signed and Sealed this

Twelfth Day of August, 2003

JAMES E. ROGAN
*Director of the United States Patent and Trademark Office*